United States Patent

[11] 3,559,771

[72] Inventor Robert L. Crane
 Hopkins, Minn.
[21] Appl. No. 741,928
[22] Filed July 2, 1968
[45] Patented Feb. 2, 1971
[73] Assignee Tol-O-Matic, Inc.
 Minneapolis, Minn.
 a corporation of Minnesota

[54] BRAKE MOTOR
 9 Claims, 3 Drawing Figs.
[52] U.S. Cl. ................................... 188/71.8,
 188/196
[51] Int. Cl. ........................................ F16d 55/18,
 F16d 65/54
[50] Field of Search ........................................... 188/72-
 —73C, 196P, 71.8

[56] References Cited
 UNITED STATES PATENTS
 3,255,846 6/1966 Livezey ..................... 188/196X
 3,379,289 4/1968 Hollnagel et al. ............ 188/196

Primary Examiner—Duane A. Reger
Attorneys—Frederick E. Lange, John J. Held, Jr. and Eugene L. Johnson ABSTRACT: The improved brake motor of the present invention is actuated by fluid under pressure so as to force a brake puck into contact with an adjacent surface of a relatively moving disc to brake or reduce the speed of the disc. The brake motor includes a piston which is positioned for reciprocal movement within a cylinder formed in the motor housing, which carries the brake puck and which is moved in response to pressure of the fluid in a pressure chamber defined in the cylinder. The motor also includes a drag ring secured within the cylinder by a resilient member which is tightly wedged between the periphery of the drag ring and the cylinder. A leaf spring and limit plate assembly are carried by the piston and cooperate with the drag ring and the piston whereby the brake puck is positively moved away from and out of contact with the disc when the brake motor is not being actuated and whereby automatic compensation for wear on the brake puck is accomplished after a predetermined amount of wear has occurred.

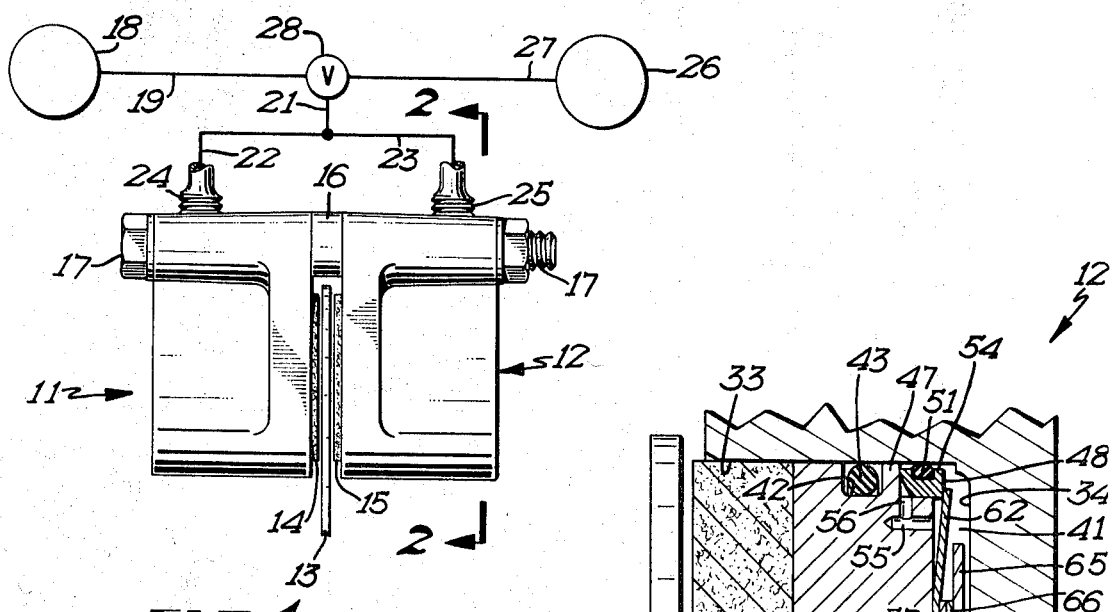
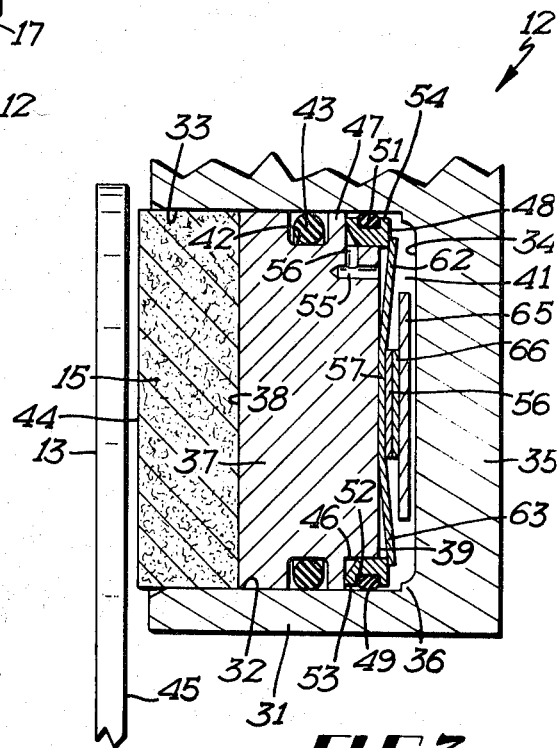
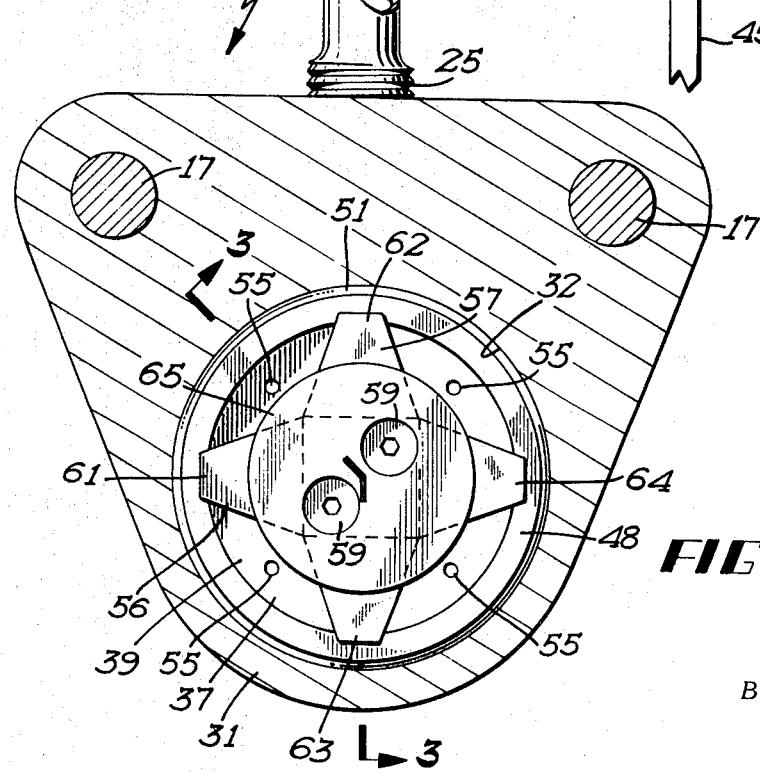
INVENTOR.
ROBERT L. CRANE
BY John J Held Jr.
ATTORNEY

BRAKE MOTOR

BACKGROUND OF THE INVENTION

This invention relates to an improved brake motor, and more particularly, to an improved brake motor in which fluid under pressure is utilized to force a brake puck into contact with a member, such as a rotating disc, to brake or reduce the speed of the disc.

In the past, brake motors of the type referred to herein have included a piston mounted for reciprocal movement within a cylinder in the motor housing. A brake puck was attached to one face of the piston and the other face of the piston was subjected to fluid under pressure when the brake motor was actuated. The pressure of the fluid caused the piston to be moved within the cylinder toward a relatively movable disc and forced the brake puck against the disc.

One problem with these prior brake motors was that the motors did not include means for moving the brake puck out of contact with the disc after a brake application had been completed. In such motors, the puck tended to remain in contact with the rotating disc, even though fluid pressure no longer forced the puck against the disc, until the vibration and/or "wobble" of the rotating disc caused the puck to be moved away from the disc. This resulted in an excessive and unnecessary wearing of the brake puck.

To attempt to overcome this problem, a prior brake motor has included a drag ring and wave spring assembly which was designed to move the brake puck away from the disc after completion of a brake application and also to compensate for wear on the brake puck. The drag ring was secured within the cylinder as a result of a tight, metal-to-metal frictional fit between the outer diameter of the ring and the cylinder. In the cylinder, the ring was positioned between the edges of a groove formed in the periphery of the piston, with the width of the groove being greater than the width of the drag ring. The wave spring was also positioned in the groove between a side of the ring and the edge of the groove adjacent to the face of the piston subject to fluid pressure. The inner diameter of the drag ring was greater than the diameter of the groove so that within the limitations of the groove, the piston was free to move, relative to the ring.

During an application of the brake, the wave spring was compressed by the movement of the piston, relative to the drag ring, toward the disc. Upon termination of the brake application, the compressed wave spring caused the piston to be moved in the opposite direction, relative to the drag ring, so that the puck was moved out of contact with the disc.

Moreover, as the brake puck was worn by repeated usage, the piston would be moved farther and farther toward the disc during brake applications until, at last, the wave spring was completely compressed between the drag ring and the shoulder of the groove. Further movement of the piston toward the disc during that or a subsequent brake application resulted in the drag ring also being forcibly moved or dragged in the cylinder toward the disc by the piston; provided, of course, the force of the pressurized fluid acting on the piston was sufficient to overcome the frictional force resulting from the tight, metal-to-metal fit between the ring and the cylinder. By this arrangement, compensation for the wear on the brake puck was accomplished.

One of the principal problems with the above-described brake motor was that the manufacturing tolerances for the cylinder and the outer diameter of the drag ring were extremely critical since the drag ring had to be secured within the cylinder by a tight, metal-to-metal frictional fit. Naturally, the requirement for close tolerances greatly increased the cost of manufacturing and assembling this brake motor. Also, for satisfactory operation, the drag ring should be relatively frequently replaced because of wear on the drag ring and/or cylinder. Such replacement was, of course, relatively expensive and time consuming. Thus, the cost of manufacturing and maintaining this brake motor frequently made the use of the brake motor impractical and uneconomical for many applications.

In addition, there was a tendency for the drag ring to "cock" in the cylinder during the usage of the brake motor so that the longitudinal central axes of the ring and cylinder were no longer coaxial. This "cocking" of the drag ring increased the force necessary to move or drag the ring within the cylinder. In fact, it has sometimes been found to be impossible to move or drag the ring within the cylinder after the ring has "cocked," particularly if the fluid used to actuate the motor is relatively low-pressure plant air. Further, the use of a wave spring was not completely satisfactory in that the force exerted by the spring changed markedly as the spring was compressed.

SUMMARY OF THE INVENTION

In contrast to the prior brake motors, the improved brake motor of the present invention utilizes a drag ring having an outer diameter which is less than the diameter of the cylinder in which the drag ring is to be secured. The drag ring is secured in the cylinder by a resilient member which is wedged tightly between the outer diameter of the ring and the cylinder. This usage of a resilient member eliminates the need for maintaining close tolerances during the manufacturing of the ring and the cylinder, and thus significantly reduces the cost of manufacturing and assembling the improved brake motor of the present invention, while also eliminating the need for frequently replacing the drag ring.

The piston utilized in the improved brake motor of the present invention includes a reduced diameter portion adjacent to the face thereof exposed to fluid pressure. The drag ring is positioned about this reduced diameter portion with the inner diameter of the ring being selected so as to be substantially equal to the diameter of the reduced diameter portion. This relationship between the inner diameter of the ring and the diameter of the reduced diameter portion and the use of a resilient member to secure the ring within the chamber, minimizes the chances of the ring "cocking" within the chamber. Moreover, even if the ring should "cock" within the chamber, this would not increase the force required to move or drag the ring within the chamber since, as noted above, the resilient member eliminates metal-to-metal contact between the ring and the cylinder.

The improved brake motor of the present invention also includes a novel spring assembly which is used to move the brake puck away from the relatively movable disc after a brake application has been completed. This spring assembly includes a pair of leaf springs which are fastened at their centers to the face of the piston which is subject to fluid pressure in the motor. The ends of the spring are spaced 90° apart and contact a side of the drag ring adjacent to the face of the piston subject to fluid pressure in the motor. The width of the drag ring is greater than the width of the reduced diameter portion so that the ring projects into the cylinder beyond the face of the piston to which the centers of the springs are attached whereby the springs are bent and always bias the piston away from the disc. Also, the spring assembly, the piston and the ring are arranged so that the resilient member is wedged more tightly between the outer diameter of the ring and the cylinder as the piston is forced to move toward the disc, relative to the ring.

The spring assembly also includes a limit plate which is secured to the same face of the piston to which the centers of the springs are attached. The limit plate is spaced from this face of the piston a preselected distance so that after, but only after, the piston has been moved a predetermined distance toward the disc, relative to the ring, the limit plate will contact the springs between the centers and ends thereof. Thereafter, upon further movement of the piston toward the disc, the spring acts as a fixed, nonresilient member and connects the limit plate, and thus the piston, with the ring, so that the ring will be moved with the piston.

Accordingly, a primary object of the present invention is to provide an improved brake motor which may be inexpensively manufactured, assembled and maintained. A related object of the present invention is to provide an improved brake motor of the type described herein wherein the drag ring utilized in the motor has an outer diameter which is less than the diameter of the cylinder in which the ring is to be secured, and wherein the drag ring is secured within the cylinder by a resilient member tightly wedged between the outer diameter of the ring and the cylinder.

Another object of the present invention is to provide an improved brake motor wherein a novel spring assembly is used, which assembly includes a pair of leaf springs attached at their centers to the center of the face of the piston subject to the fluid pressure, with the ends of the springs abutting a side of the drag ring so that movement of the piston, relative to the ring, toward the disc, results in the resilient member being even more tightly wedged between the outer diameter of the ring and the cylinder. A related object of the present invention is to provide an improved brake motor of the type described herein wherein a limit plate is also attached to the face of the piston subject to fluid pressure but is spaced from the face and the springs a preselected distance, the limit plate being positioned so that after the piston has moved a predetermined distance toward the disc, the limit plate contacts the springs between their centers and ends whereby upon further movement of the piston toward the disc, the springs function as a fixed, nonresilient member for the purpose of connecting the limit plate, and thus the piston, with the ring so as to cause the ring to be moved or dragged with the piston within the cylinder.

Still another object of the present invention is to provide an improved brake motor wherein the piston includes a reduced diameter portion and the drag ring is positioned about this reduced diameter portion, with the inner diameter of the ring being substantially equal to the diameter of the reduced diameter portion. A related object of the present invention is to provide an improved brake motor of the type described herein wherein the width of the ring is greater than the width of the reduced diameter portion so that the ring projects beyond the face of the piston to which the leaf springs are attached so that there is a predetermined initial bias exerted by the springs on the piston.

These and other objects and features of the present invention will become apparent from the following description of the preferred embodiment of the present invention, taken in conjunction with the accompanying drawings.

DESCRIPTION OF THE DRAWINGS

FIG. 1 shows a pair of the improved brake motors of the present invention, together with a system, shown schematically, for actuating the improved brake motors.

FIG. 2 is a vertical, cross-sectional view taken along lines 2—2 in FIG. 1.

FIG. 3 is a vertical, cross-sectional view taken along lines 3—3 in FIG. 2.

Throughout the various figures of the drawings, the same reference numerals have been used to designate the same or identical parts or elements. Furthermore, when the terms "right," "left," "right end," "left end," "rightward" and "leftward" are used herein, it should be understood that these terms have reference only to the structure shown in the drawings, as it would appear to a person viewing the drawings, and are utilized only to facilitate describing the invention.

DESCRIPTION OF THE PREFERRED EMBODIMENT

Referring now to FIG. 1, two improved brake motors 11 and 12 of the present invention are shown positioned on opposite sides of a rotating disc 13. The disc 13 may be mounted on and carried by a rotating shaft, not shown, which, for example, may constitute a part of a machine tool, such as a lathe. The brake motors 11 and 12 are arranged so that actuation of the motors causes the brake pucks 14 and 15 of the motors 11 and 12, respectively, to be forced into contact with opposite sides of the disc 13 whereby the speed of the disc 13 is braked or reduced.

To insure correct spacing between the motors 11 and 12 and the disc 13, a plate 16 is positioned between the motors 11 and 12, and is spaced from the disc 13 so as to prevent any contact between the plate 16 and disc 13. The motors 11 and 12 are secured together by a pair of bolts 17 which also extend through and secure the plate 16 to the motors. The motors 11 and 12 may be mounted on appropriate supporting structure, not shown, by conventional fastening means.

As more fully described hereinbelow, the motors 11 and 12 are connected with a source of pressurized fluid, shown schematically at 18, by conduits 19, 21 and branch conduits 22 and 23 and fittings 24 and 25 for the purpose of actuating the motors. The pressurized fluid may be air, such as plant air, or a liquid, such as conventional hydraulic fluid. The pressurized fluid, introduced into the motors 11 and 12, is exhausted from the motors through the fittings 24 and 25, the branch conduits 22 and 23, the conduit 21 and a conduit 27 to a sump 26. A valve 28 is positioned at the juncture of conduits 19, 21 and 27 and is utilized to control whether the pressure fluid is introduced into or exhausted from the motors 11 and 12. The operation of the valve 28 may be controlled by a conventional valve actuator, not shown, which, in turn, may be manually or automatically operated.

The motors 11 and 12 are identical to each other both in structure and mode of operation. For this reason only a detailed description of motor 12 is included herein.

Referring now to FIGS. 2 and 3, motor 12 includes a housing 31 having a cylinder 32 formed therein. The cylinder 32 has an open end 33 and an end 34 which is closed by an integral end wall 35 of the housing 31. The cylinder 32 has a substantially uniform diameter throughout except for a radially inwardly directed shoulder 36 adjacent the closed end 34.

A piston 37 is mounted within the cylinder 32 for reciprocal movement therein, parallel to the longitudinal central axis of the cylinder 32. The piston 17 has an outer diameter which is substantially equal to the diameter of the cylinder 32, and has front and rear faces 38 and 39 formed thereon which are substantially perpendicular to the longitudinal central axis of the cylinder and which are positioned adjacent the open and closed ends 33 and 34 of the cylinder, respectively.

A pressure chamber 41 is defined within cylinder 31 between the face 39 of the piston 37 and the closed end 34 of the cylinder 32. The chamber 41 is, at all times, in fluid communication with conduit 23, and thus is in fluid communication with either the source 18 of pressure fluid or the sump 26, depending on the position of the valve 28. An annular groove 42 is formed about the periphery of the piston 37 approximately midway between the faces 38 and 39, and a conventional O-ring seal 43 is positioned within the groove 42 to minimize leakage of fluid between the piston and the cylinder.

The brake puck 15 is secured to the face 38 of the piston 37 by a pair of screws, not shown, which are countersunk in the outer face 44 of the puck 15 so that the heads of the screws do not contact the surface 45 of the disc 13 when the face 44 of the puck is forced against the surface 45. The outer diameter of the puck 15 is substantially equal to the diameter of the cylinder 32 and thus the diameter of piston 37. The brake puck 15 is of conventional design and manufacture, and is made of a molded, cured asbestos material having a plurality of brass chips interdispersed therein so as to make the puck highly resistant to deterioration by friction and heat. A brake puck that may be used is Type R-1492-4XB, manufactured by Raybestos-Manhattan, Inc. of Stratford, Conn.

The introduction of pressurized fluid into the chamber 41 causes the brake motor to be actuated, and thus a brake to be applied to the disc 13, i.e., the brake puck 15 to be forced in contact with the surface 45 of the rotating disc 13. The friction resulting from the contact between the face 44 and the surface 45 of the disc brakes or reduces the speed of the disc.

The puck remains firmly in contact with the surface 45 of the disc 13 until the valve 28 is moved so that the chamber 41 is connected with the sump 26 whereby the fluid in chamber 41 is exhausted to the sump 26. In contrast with some of the prior brake motors, the improved brake motor 12 of the present invention automatically causes the puck to be moved out of contact with the surface 45 of the disc 13 after an application of the brake has been completed, and automatically compensates for wear on the face 44 of the puck which occurs as a result of repeated applications of the brake. For this purpose, the piston 37 has a reduced diameter portion 46 formed thereon adjacent the face 39. A shoulder 47 separates the reduced diameter portion 46 from the groove 42 and forms the lefthand end of the portion 46.

A drag ring 48 is positioned about the reduced diameter portion 46 of the piston 37. The inner diameter of the drag ring 48 is substantially equal to the outer diameter of the reduced diameter portion 46, although the piston may move freely, relative to the ring, as explained below. This relationship between the inner diameter of the ring and the outer diameter of the portion 46 tends to minimize the chances of the ring "cocking" within the cylinder. The outer diameter of the ring is less than the diameter of the cylinder 32 so that there is never any direct contact between the ring and the cylinder.

An annular groove 49 is formed about the periphery of the ring 48. An annular, resilient member 51 is positioned within the groove 49.

The thickness of the member 51 in the radial direction, relative to the cylinder 32, must be greater than the radial distance between the bottom 52 of the groove 49 and the cylinder 32, so that when the ring 48 is positioned within the cylinder 32, the member 51 is tightly wedged between the bottom 52 of the groove 49 and the cylinder 32, with the expansion of the member 51, in a direction substantially parallel to the longitudinal axis of the cylinder, being restricted by the shoulders 53 and 54 of the groove 49. This wedging of the member 51 between the ring 48 and the cylinder 32 prevents movement of the ring 48 within the cylinder 32, except as explained more fully hereinafter. It has been found that a conventional O-ring may be used as the member 51.

Four equispaced bores 55 are drilled into the face 39 of the piston substantially parallel to the longitudinal central axis of the piston and these bores communicate with four radial bores 56 which are drilled at equally spaced points about the periphery of the reduced diameter portion 46. The bores 55 and 56 are positioned so as to permit both sides of the ring 48 to be exposed to the fluid in the chamber 41 whereby the pressure of the fluid acting on the ring is balanced. To facilitate this, the side of the ring 48 adjacent to the shoulder 47 is partially cut away, as shown, to insure that fluid may at all times be present between the shoulder 47 and the ring 48.

As best shown in FIG. 2, a pair of leaf springs 57 and 56 are attached, adjacent their centers, to the center of the face 39 of the piston 37 by a pair of Allen screws 59. The ends 61, 62 and 63, 64 of the springs 56 and 57, respectively, are spaced from the other ends by 90°, and abut the lower portion of the side of the ring 48.

As will be apparent from FIG. 3, the width of the ring 48, in a direction parallel to the longitudinal central axis of the piston 37, is greater than the width of the reduced diameter portion 46, i.e., the distance between the shoulder 47 to the face 39, so that the ring 48 extends beyond the face 39 and projects into the chamber 41. As a result of the projection of the ring 48 beyond the face 39, the ends 61, 62, and 63, 64 of the springs 56 and 57 are deflected, relative to the center portions of the springs, which as noted above, are attached to the center of the face 39 immediately adjacent to the face 39. This deflection of the springs 56 and 57 biases the piston 37 to the right within the cylinder 32, i.e., toward the closed end 34 of the cylinder 32, relative to the ring 48, and, of course, this bias of the springs 56 and 57 is increased as the piston 37 is moved to the left in cylinder 32. This arrangement of the springs, ring and piston causes the piston to be positively moved to the right in cylinder 32, away from the disc 13, when the chamber 41 is connected with the sump 26 after a brake application. Moreover, the above-described arrangement of the springs 56 and 57 and the ring 48 results in the member 51 being wedged more tightly between the ring 48 and the cylinder 32, as the piston 37 is moved to the left during a brake application thereby insuring that there will be no inadvertent movement of ring 48 in the cylinder 32 during a brake application.

A limit plate 65 is attached to the face 39 of the piston 37 by the screws 59. A spacer 66 is also attached to the face 39 by the screws 59 and is positioned between the plate 65 and the center portions of the springs 56 and 57. The outer diameter of the plate 65 is less than the diameter of the reduced diameter portion 46 of the piston but extends radially beyond the perimeter of the spacer 66 and the center portions of the springs 56 and 57. As shown in FIG. 3, the plate 65 lies in a plane spaced, a preselected distance, to the right of, but substantially parallel to, the face 39. The distance between the face 39 and the plate 65 can be varied by utilizing a spacer having a different thickness and is selected so that the movement of the piston 37 within the cylinder, relative to the ring 48, will not damage the springs 56 and 57 before compensation is made for the wear on the puck face 44. In other words, the distance between the plate 65 and the face 39 is such that after the piston 37 has been moved towards the open end 33 of the cylinder 32 a predetermined distance, relative to the ring 48, the periphery of the plate 65 contacts the springs 56 and 57 between their ends and their center portions. Thereafter, further movement of the piston 32 towards the end 33 will result in the springs 56 and 57, and more particularly that portion of the springs between the point of contact between the springs 56 and 57 and the plate 65 and the ends 61, 62 and 63, 64 of the springs, acting or functioning as a fixed, nonresilient member so that the ring 48, in effect, becomes a part of the piston 37 and is moved toward the end 33 with the piston under the influence of the pressure in chamber 41. The pressure of the fluid in the chamber 41 is selected so that the force exerted by the fluid is greater than the frictional force or drag force resulting from the wedging of the member 51 between the ring 48 and the cylinder 32 whereby when the plate contacts the springs 56 and 57 and thereafter moves farther toward the end 33, the ring 48 moves with the piston 37.

OPERATION

The operation of the improved brake motor 12 is as follows: When fluid under pressure is introduced into the chamber 41 from the source 18, the pressure of the fluid causes the piston 37, and thus the puck 15, to be moved to the left from the position shown in FIG. 3 to a position wherein the face 44 of the puck 15 is forced tightly against the surface 45 of the disc 13 to brake or reduce the rotational speed of the disc 13. When the fluid in chamber 41 is exhausted to the sump 26, by adjustment of the valve 28, the springs 56 and 57 cause the piston, and thus the puck 15, to move to the right in the chamber 32 toward the closed end 34 thereof.

However, in time, the face 44 of the puck 15 will be worn away due to the deterioration of the face caused by the heat and friction generated by repeated contacts between the face 44 of the puck 15 and the rotating disc 13. Therefore, as the face 44 is worn away, the piston 37 will have to be moved farther and farther toward the left, from the position shown in FIG. 3, before the puck 15 is forced into contact with the surface 45 of the disc 13. Over a period of time, the wear on the face 44 will be such that the piston 37 will have to be moved to the left to such an extent that the periphery of the plate 65 will contact the springs 56 and 57. Further, wear on the puck face 44 will result in the piston 37 being moved even farther to the left in cylinder 32 during a brake application, and this further leftward movement of the piston will cause the ring 48 to be dragged to the left in the cylinder 32 by the piston. Thereafter, as soon as the pressure in the chamber 41 is exhausted to the sump 26, the piston will again be returned to the right within the cylinder 32 by the springs 56 and 57. However, the drag ring 48 will remain in its new position, leftwardly of its original position, since the force of the springs 56 and 57 is not sufficient to move the ring 48 in the cylinder 32. Thus, the rightward movement of the piston 37 within the cylinder 32 will be stopped when the shoulder 47 contacts the adjacent side of the ring 48.

From this new position of the drag ring 48 and the piston 37, the piston will be moved within cylinder 32, relative to the ring 48, by subsequent introduction and exhaustion of fluid into and out of chamber 41. Moreover, when the puck face 44 has again been worn away enough so that leftward movement of the piston 37 causes the plate 65 to contact the springs 56 and 57, the drag ring 48 will be again moved to the left in chamber 32 to a third position. This repositioning of the drag ring 48, within the cylinder 32, will be continued until the puck is worn out and must be replaced.

In view of the foregoing, it is apparent that the improved brake motor described herein, and more particularly the novel spring, piston and drag ring arrangement, not only permits the brake puck to be positively moved away from the disc after a brake application, but also automatically compensates for wear on the face of the brake puck. Furthermore, the improved brake motor described herein can be relatively inexpensively manufactured, assembled and maintained, since the piston and drag ring do not require close tolerance machining. Moreover, since there is no metal-to-metal contact between the drag ring and the cylinder, any "cocking" of the drag ring within the cylinder will not render the brake motor inoperative and wear on the drag ring caused by usage of the brake motor does not necessitate replacement of the entire drag ring.

Various modifications, of course, can be made in the brake motor structure described hereinabove. For example, the left member 51 which secures the drag ring 48 within the piston cylinder 32 can take other shapes than that described, and the specific configuration of the springs 56 and 57 could be changed. Also, the disc could be a linear bar, and the brake motor could be moving relative to the bar. For example, this arrangement could be used on a planer table so that the brake motor would be used to stop and/or hold the table relative to the base.

Therefore, it should be noted that this invention may be embodied in other specific forms without departing from the spirit or central characteristics thereof. Thus, the present embodiment is to be considered as illustrative and not restrictive, the scope of the invention being dictated by the appended claims rather than by the foregoing description, and all changes which come within the meaning and the range of equivalency of the claims are therefore intended to be embraced therein.

I claim:

1. An improved brake motor for selectively moving a brake puck into and out of contact with a relatively movable body so as to brake or reduce the speed of the body, the improved brake motor comprising:
   a motor housing having a cylinder formed therein, said cylinder having an open end and a closed end;
   a piston positioned in said cylinder for reciprocal movement therein parallel to the central longitudinal axis of said cylinder, the piston having an outer diameter substantially equal to the diameter of said cylinder, a first face formed thereon adjacent to the open end of said cylinder, a second face formed thereon adjacent to the closed end of said cylinder, and a reduced diameter portion formed about the periphery of the piston;
   a pressure chamber in said cylinder between the second face of the piston and the closed end of said cylinder;
   a source of fluid under pressure;
   a sump;
   means for selectively connecting said pressure chamber either with the source of fluid under pressure or with the sump, the pressure of the fluid in said pressure chamber being sufficient to cause the piston to move toward the open end of said cylinder when said pressure chamber is connected with the source of fluid under pressure;
   a brake puck attached to and carried by the first face of the piston, the brake puck having a face, remote from the first face of the piston, that is adapted to contact an adjacent surface of a relatively movable body;
   a drag ring positioned about the reduced diameter portion of the piston, the drag ring having an outer diameter less than the diameter of the cylinder so as to prevent metal-to-metal contact between the drag ring and the cylinder, and having an inner diameter substantially equal to the diameter of the reduced diameter portion of the piston whereby there may be relative movement between the drag ring and the reduced diameter portion of the piston;
   resilient means carried by the drag ring and positioned adjacent to the periphery of the drag ring and in a coradial plane with the drag ring between the drag ring and the cylinder to secure the drag ring within the cylinder and to prevent movement of the drag ring in response to said reciprocal movement of the piston within said cylinder, with the radial dimension of the resilient means being greater than the radial distance between the periphery of the drag ring and the cylinder so that the resilient means is tightly wedged between the periphery of the drag ring and the cylinder when the drag ring is within said cylinder;
   means for conducting the fluid in said pressure chamber to both sides of the drag ring and the resilient member so as to balance the force of the fluid acting on the sides of the drag ring and the resilient means;
   spring means extending between the piston and the drag ring for urging the piston to move, relative to the drag ring, toward the closed end of the cylinder against the force exerted by the fluid in said pressure chamber and for causing an outward radial force to be exerted against said resilient means so as to wedge the resilient means tighter between the periphery of the drag ring and the cylinder during the movement of the piston toward the open end of said cylinder, relative to the drag ring, caused by the pressure of the fluid on said pressure chamber, the force exerted by the spring means being substantially less than the force exerted by the fluid in said pressure chamber when said pressure chamber is connected with the source of fluid under pressure, but greater than the force exerted by the fluid in said pressure chamber when said pressure chamber is connected with the sump; and
   limit plate means connected with the piston and movable therewith, the limit plate being positioned, relative to the piston, so that after the piston has been moved through a preselected distance toward the open end of said cylinder, the limit plate becomes connected with the drag ring so that continued movement of the piston toward the open end of said cylinder causes the drag ring to also be moved, relative to said cylinder, with the piston toward the open end of said cylinder.

2. The improved brake motor described in claim 1 wherein the spring means includes at least one left spring which is attached, intermediate its ends, to the second face of the piston and which is arranged so that its ends contact the drag ring at diametrically opposite points.

3. The improved brake motor described in claim 1 wherein the spring means includes at least two leaf springs which are attached, at their center portions, to the center of the second face of the piston and which are arranged so that the ends of each leaf spring contact the drag ring at diametrically opposite points and so that the angles between adjacent ends of the leaf springs are equal.

4. The improved brake motor described in claim 2 wherein the reduced diameter portion of the piston is adjacent the second face of the piston; wherein the width of the drag ring is greater than the width of the reduced diameter portion of the piston so that one side of the drag ring projected beyond the second face of the piston; and wherein the ends of the leaf spring abut said one side of the drag ring.

5. The improved brake motor described in claim 1 wherein the reduced diameter portion of the piston is adjacent the second face of the piston; wherein the limit plate means includes a plate attached to but spaced from the second face of the piston and from the spring means; and wherein after the piston has been moved through said preselected distance, relative to the drag ring, toward the open end of said cylinder, the plate contacts the spring means and causes the spring means to function, during continued movement of the piston toward the open end of said cylinder, as a substantially nonresilient member for transmitting force between the piston and the drag ring.

6. The improved brake motor described in claim 5 wherein the plate is attached at its center to the center of the second face of the piston but is spaced from the second face of the piston and from the spring means toward the closed end of the cylinder; and wherein the spacing between the plate and the second face of the piston may be varied.

7. The improved brake motor described in claim 1 wherein the reduced diameter portion of the piston is adjacent the second face of the piston; wherein the limit plate means includes a plate attached to, but spaced from, the second face of the piston and from the spring means; wherein the spring means includes at least two leaf springs which are attached, adjacent their center portions, to the center of the second face of the piston and which are arranged so that the ends of each of the leaf springs contact one side of the drag ring at diametrically opposite points and so that the angles between the adjacent ends of the left springs are equal; and wherein after the piston has been moved through said preselected distance, relative to the drag ring, toward the open end of said cylinder, the plate contacts the leaf springs between their center portions and each end thereof and causes leaf springs to function during continued movement of the piston toward the open end of said cylinder as a substantially nonresilient member for transmitting force between the piston and the drag ring.

8. The improved brake motor described in claim 7 wherein the plate is attached at its center to the center of the second face of the piston but is spaced from the second face of the piston and from the spring means in a direction toward the closed end of the cylinder; and wherein the spacing between the plate and the second face of the piston may be varied.

9. The improved brake motor described in claim 7 wherein the reduced diameter portion of the piston is adjacent the second face of the piston; wherein the width of the drag ring is greater than the width of the reduced diameter portion of the piston so that one side of the drag ring projects beyond the second face of the piston; and wherein the ends of the leaf spring abut said one side of the drag ring.